L. D. WOODRUFF.
FLUID PRESSURE COUPLING.
APPLICATION FILED JULY 9, 1917. RENEWED APR. 21, 1919.
1,305,582.
Patented June 3, 1919.
2 SHEETS—SHEET 1.
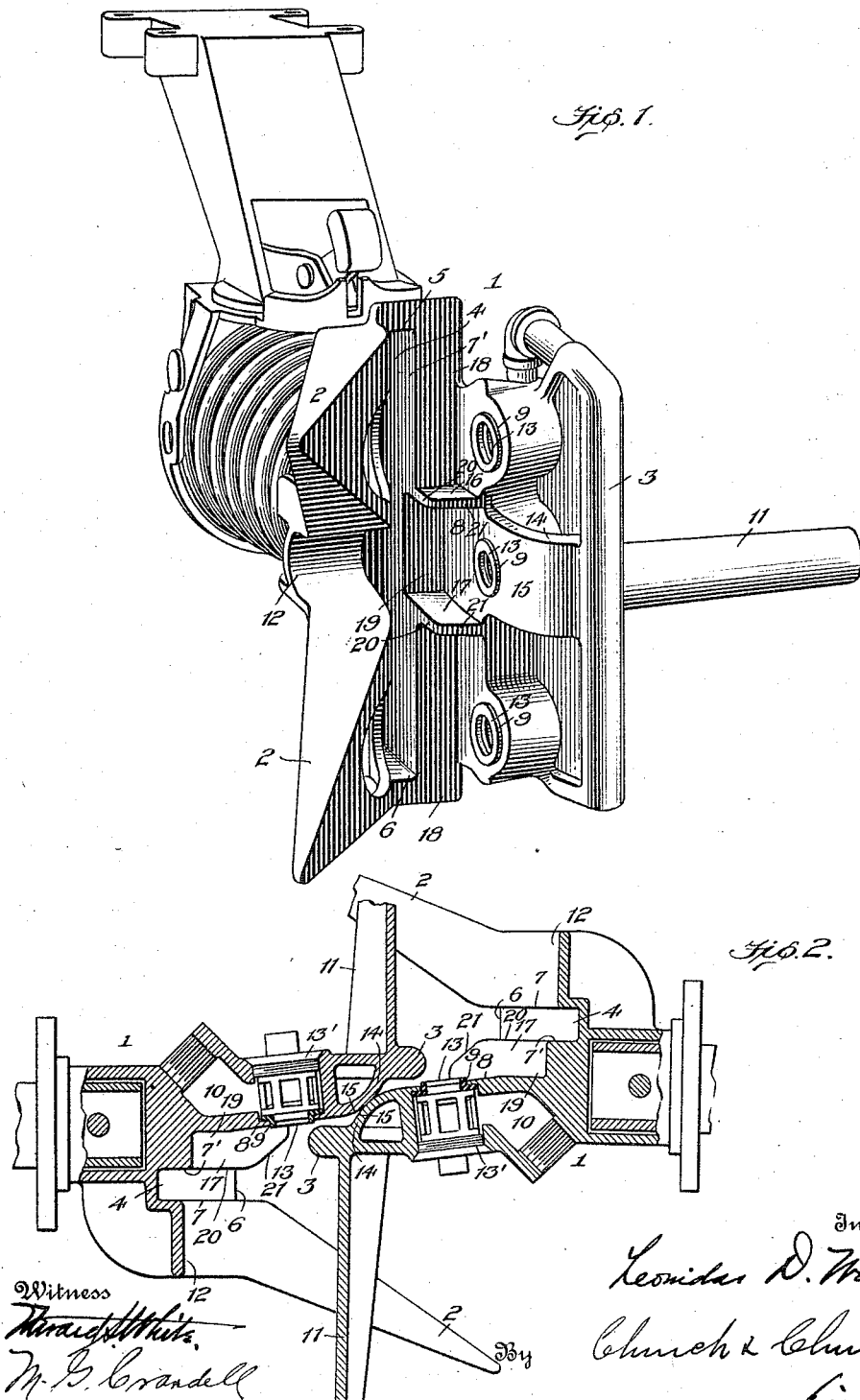

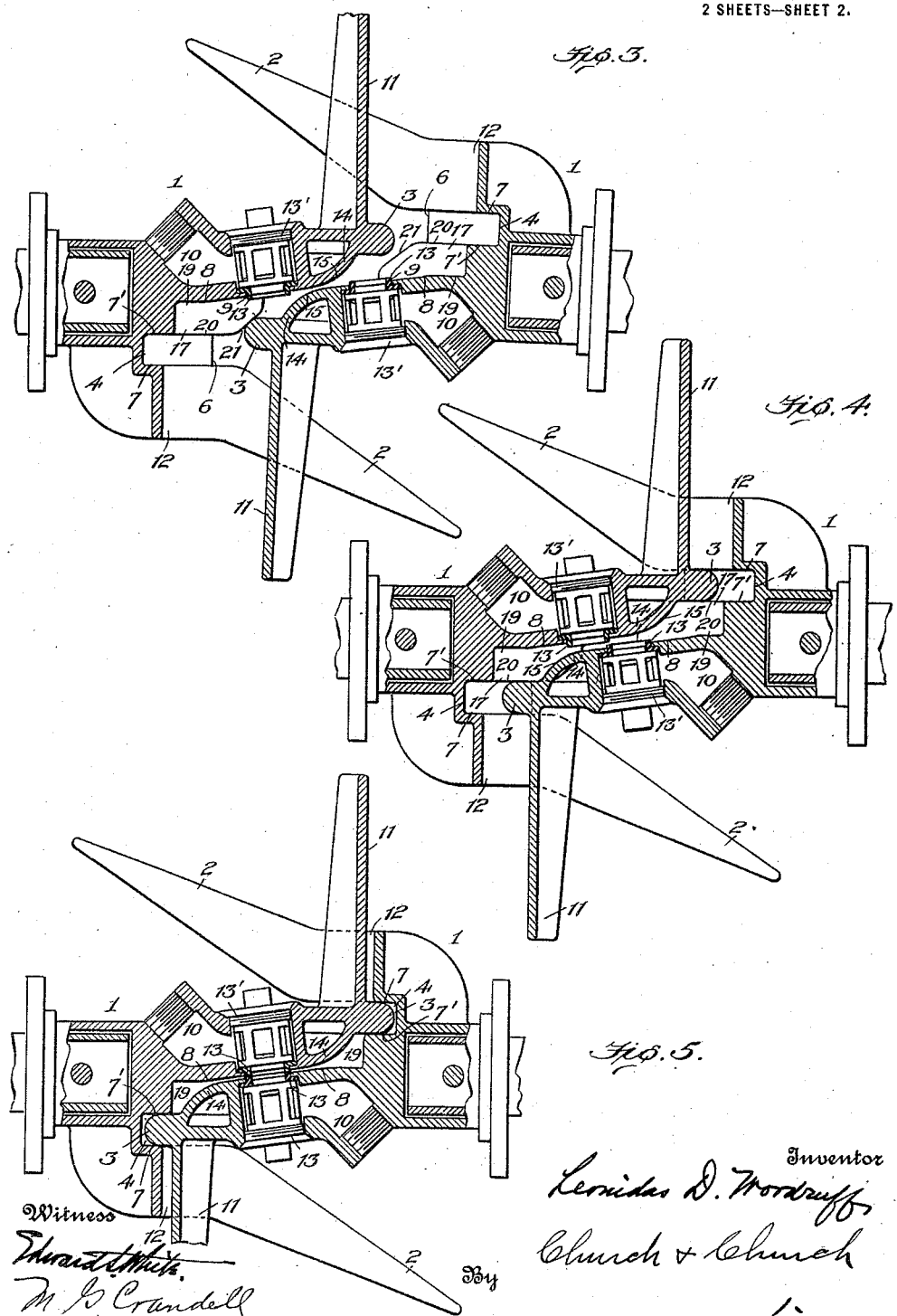

UNITED STATES PATENT OFFICE.

LEONIDAS D. WOODRUFF, OF NORWOOD, OHIO, ASSIGNOR TO UNION CONNECTOR COMPANY, OF WILMINGTON, DELAWARE, A CORPORATION OF DELAWARE.

FLUID-PRESSURE COUPLING.

1,305,582.  Specification of Letters Patent.  Patented June 3, 1919.

Application filed July 9, 1917, Serial No. 179,442. Renewed April 21, 1919. Serial No. 291,726.

*To all whom it may concern:*

Be it known that I, LEONIDAS D. WOODRUFF, a citizen of the United States, residing at Norwood, in the county of Hamilton and State of Ohio, have invented certain new and useful Improvements in Fluid-Pressure Couplings; and I do hereby declare the following to be a full, clear, and exact description of the same when taken in connection with the accompanying drawings, forming part of this specification.

This invention relates generally to automatic fluid pressure couplings for effecting coupling of the pipe line, or lines of railway vehicles.

The present improvements relate more particularly to the coupler heads of such fluid pressure couplings and are preferably embodied in a coupler head of the type illustrated in my prior Patent No. 1,102,622, dated July 7, 1914. A coupler head of this type is mounted on a railway vehicle and coöperates with a companion coupler head mounted on another railway vehicle, for the purpose of automatically connecting together the pipe lines of the vehicles when they are coupled together in the usual way. Each coupler head is provided with ports connected with the pipe lines of the vehicle which ports are brought into registry with ports in the companion coupler head, when two heads are in coupled position, thereby coupling the pipe lines together. Ordinarily, it is essential that gaskets be seated in the ports of companion coupler heads in order to effect fluid pressure tight coupling. The employment of gaskets, although quite essential, has heretofore been a constant source of expense and trouble, for the reason that the gaskets are unprotected and as an obvious result, the faces of the gaskets are frequently sheared or otherwise mutilated, during movement of the heads in coupling or uncoupling.

The present invention is the result of a careful study of the problems requiring solution in order to make automatic fluid pressure couplings for railway vehicles efficient and practicable in every sense and the result of particular attention to the provision of a coupler head constructed so as to make fluid pressure tight coupling with a companion coupler head, without causing undue wear or rapid mutilation of the gaskets seated in the ports of the heads during coupling or uncoupling. It may therefore be stated that the primary object of the invention is to provide means for preventing shearing of the gaskets when the coupler heads are moved into or out of coupled position.

With the above object in view, the invention consists in certain novel constructions, arrangements and combinations of parts, hereinafter described in a preferred form and particularly pointed out in the claims at the end of the specification.

In the drawings:

Figure 1 is a front perspective view of a coupler head provided with the present improvements.

Fig. 2 is a horizontal sectional elevation of companion coupler heads of the type illustrated in Fig. 1, the view showing the heads in the first position they assume in the act of coupling.

Fig. 3 is a view similar to Fig. 2, but showing the companion heads in the next stage of coupling.

Fig. 4 is another similar view showing the companion heads in the positions they assume just before final coupling is effected.

Fig. 5 is still another similar view showing the companion heads in final coupled position.

Like characters of reference in the several figures indicate the same parts.

As hereinbefore stated, the improvements made by the present invention may be conveniently, although not necessarily, embodied in a coupler head of the type disclosed in my prior Patent No. 1,102,622. A coupler head of this type has therefore been adopted for illustrating the invention, and, while features of the coupler head claimed in my said prior patent form no part of this invention, it is thought that the following brief description of the general structural organization and main features of operation of the coupler head will aid very materially in arriving at an understanding of this invention.

Referring to the drawings, the coupler head 1 is provided with a pair of divergent guiding arms 2, both located on the same side of the longitudinal axis of the head. Projecting forwardly from the head on the opposite side from the arms 2 is a broad tongue 3, of less length, however, than said arms 2. A guiding pin 11 projects laterally from the outer face of the tongue 3 and is adapted to be guided by the divergent arms 2 of the companion head into a recess 12 located at the inner ends of said arms. Between the guiding arms 2 and the tongue 3 the coupler head is formed with a vertically elongated socket 4 having top and bottom walls designated respectively by the reference numerals 5 and 6 and side walls 7, 7' as shown more particularly in Fig. 1. The socket 4 is dimensioned to receive the tongue of a companion coupler head, in the manner illustrated in Fig. 5. The coupling face 8 of the coupler head is formed by a vertical wall interposed between the adjacent side wall of the socket 4 and the tongue 3, said vertical wall forming the coupling face being located in a plane intermediate the plane of the socket wall and the plane of the tongue, as shown in Fig. 1. Formed in the coupler head and opening onto the coupling face 8 are sockets 9 communicating with passages 10 which are respectively adapted to be connected in any suitable manner with the several pipe lines of a railway vehicle. In the present instance, the coupler head is provided with three sockets 9 and passages 10 which are connected with the air steam and signal lines of the railway vehicle on which the coupler head is mounted. Seated in the sockets 9 are gaskets 13 held in position by means of ported plugs 13'. The gaskets 13 project slightly beyond the coupling face 8 as shown in Figs. 2 to 5 inclusive.

The main features of operation of a coupler head of the type above described may now be briefly outlined, as follows: When two coupler heads of similar constructions are brought together, the projecting tongue 3 of each head will engage the inner surface of the guiding arms 2, and each laterally projecting pin 11 will enter the space between the guiding arms 2 of the companion head. There is thus provided on each head a triple guiding means, consisting of the tongue, pin, and divergent arms, which guiding means coöperates with similar triple guiding means on the companion head, thereby insuring accurate engagement of the heads and positive guiding of the latter into position to bring the coupling faces 8 into engagement and the several ports 9 into registry with each other. As the heads are thus guided into coupled position, the tongues 3 enter the sockets 4 of companion heads and the pins 11 enter the recesses 12 at the inner ends of the divergent arms 2. In coupled position, the pins 11 in the recesses 12 center the heads vertically by reason of the engagement of the pins with the edges of the arms 2; and the tongues 3 in the sockets 4 center the heads transversely by the engagement of said tongues with the side walls 7, 7' of the sockets.

The present invention is particularly for the purpose of preventing shearing or side-swiping of the gaskets 13 which are seated in the ports 9 and project outwardly slightly beyond the coupling faces and are therefore liable to be engaged and mutilated by the tongues 3 as the latter are being moved into their sockets and also by the coupling faces 8 during movement of said faces into position to bring the ports 9 of companion heads into registry with each other. According to the invention, such shearing or side-swiping of the gasket faces is prevented by causing the coupler heads to move angularly or out of alinement with respect to the longitudinal axis of the heads, in such manner that the tongues and the coupling faces, as the tongues move toward their sockets and the coupling faces into position to bring the ports into registry are shifted laterally clear of the gaskets. The gaskets are not allowed to contact with each other until the ports of companion heads have been brought practically into registry.

The preferred means for carrying out the above novel and exceedingly advantageous result is embodied in the following instrumentalities which may be conveniently formed or mounted on each coupler head: As shown more particularly in Figs. 2 to 5 inclusive, the coupling face 8 of the coupler head is inclined with respect to the longitudinal axis of the coupler head, outwardly toward the tongue 3. Substantially centrally located with respect to the vertical axis of the tongue 3 and connecting the tongue with the coupling face 8 is a horizontal bridge 14, hereinafter termed "the outer bridge". The vertical face 15 of said bridge 14 curves from the coupler face 8, toward the tongue 3, the outer terminus of said face 15 being located just behind the front vertical edge of the tongue, as shown. Projecting laterally from the coupler face 8 and positioned behind the outer bridge 14, are inner bridges 16, 17, formed by horizontal substantially thin webs extending longitudinally from the inner terminus of the outer bridge 14 to the lateral vertical face 18 of the side wall 7' of the socket 4. The inner bridges 16, 17, are respectively positioned above and below outer bridge 14, the vertical distance between the inner bridges being great enough to permit the outer bridge of a companion head to enter the socket 19 between the inner bridges. Said socket 19 is substantially deep and extends inwardly beyond the lateral face 18 of vertical wall 7' for the reception of the outer portion of the outer bridge 14 of the companion coupler head. The outer bridge is substantially thick vertically relatively to the inner bridges and practically fills the inner portion of socket 19 when two coupler heads are in coupled position, in the manner shown in Fig. 5. As shown in Figs. 2 to 5 inclusive, the outer portions of the longitudinal edges 20 of the two inner bridges 16, 17, are inclined with respect to the longitudinal axis of the coupler head, toward the coupler face 8, said inclined edges being designated by the reference numeral 21.

The operation of the above described novel construction is as follows: When a pair of companion coupler heads are moved toward each other to effect coupling, preliminary engagement may take place between the outer bridges 14 of the companion coupler heads causing the tongues 3 to shift laterally away from each other and away from the coupling faces 8, in the manner illustrated in Fig. 2. As the coupling movement progresses the vertical edges of the tongues 3 are engaged by the inclined edges 21 of the inner bridges 16, 17, which engagement, as shown in Fig. 3, guides the tongues away from the faces 8 and the gaskets in the ports toward the tongue receiving sockets 4, the movement of the two coupler heads being at a slight angle with respect to the longitudinal axes of the heads. On further movement of the two coupler heads toward each other, the outer bridges 14 enter the sockets 19 between the inner bridges 16, 17. The movement of the heads now proceeds substantially parallel with the longitudinal axes of the heads and the tongues 3 are guided by the longitudinal edges 20 of the inner bridges 16, 17, into the sockets 4, as shown in Fig. 4, thereby bringing the coupling faces 8 of the companion heads gradually into coupled engagement and the ports 9 into registry. As the coupling faces 8 of the companion heads are inclined in the same direction from the longitudinal axes in the manner hereinbefore set forth, engagement of the coupling faces will not take place until the coupling movement is practically completed and the ports 9 are brought practically into registry. Thus shearing of the gaskets is prevented during practically the entire coupling movement, first, by causing the tongues 3 to shift laterally away from the coupling faces 8 and gaskets 13 and second by the inclined coupling faces 8, which prevent engagement until the parts are practically in final coupled position. In uncoupling, the movement is obviously just the reverse of that above set forth, and shearing or mutilating of the gaskets is therefore prevented when uncoupling, in the same manner as in coupling. From the above description it will be noted that the invention practically obviates damage to the gaskets insuring a much longer life, and greatly reducing operating troubles and expense.

What is claimed is:—

1. The combination, in a fluid pressure coupling, of a coupler head having a coupling face adapted to be moved into coupled position with a coöperating coupling face of a companion head, there being a port in the coupling face of the head adapted to register with a port in the coupling face of the companion head, a gasket seated in the port adapted to engage a gasket seated in the port of the companion head at the end of the coupling movement, and means for shifting the coupler head laterally away from the companion head during coupling and uncoupling movements and for effecting engagement of the coupling face with the coupling face of a companion head, when the ports of said faces are moved into substantial registry with each other at the end of the coupling movement, said faces engaging one another at the point of maximum lateral displacement of the coupling heads from their normal positions.

2. The combination, in a fluid pressure coupling of a coupler head having a coupling face adapted to be moved into coupled position with a coöperating coupling face of a companion head, there being a port in the coupling face of the head adapted to register with a port in the coupling face of the companion head, a gasket seated in the port adapted to engage a gasket seated in the port of the companion head at the end of the coupling movement, and guiding means on the head engageable with the companion head for shifting the heads laterally away from each other during the coupling and uncoupling movements to prevent engagement of the moving heads with the gaskets, said heads remaining at the point of their maximum lateral displacement until the gaskets have engaged each other.

3. The combination, in a fluid pressure coupling, of a coupler head having a coupling face adapted to be moved into coupled position with a coöperating coupling face of a companion head, there being a port in the coupling face of the head adapted to register with a port in the coupling face of the companion head, a gasket seated in the port adapted to engage a gasket seated in the port of the companion head at the end of the coupling movement, and guiding means on the head engageable with similar guiding means on the companion head for shifting the heads laterally away from each other during the coupling and uncoupling movements to prevent engagement of the moving heads with the gaskets, said heads remaining at the point of their maximum lateral displacement until the gaskets have engaged each other.

4. The combination, in a fluid pressure coupling, of a coupler head having a coupling face adapted to be moved into coupled position with a coöperating coupling face of a companion head, there being a port in the coupling face of the head, adapted to register with a port in the coupling face of the companion head, a gasket seated in the port adapted to engage a gasket seated in the port of the companion head at the end of the coupling movement, guiding means on the head engageable with the companion head for shifting the heads laterally away from each other during the coupling and uncoupling movements to prevent engagement of the moving heads with the gaskets, and means for bringing the gasket of one head into engagement with the gasket of the companion head, when the gaskets are brought substantially into registry with each other at the end of the coupling movement said gaskets engaging each other at the point of maximum lateral displacement of the heads from their normal positions.

5. The combination, in a fluid pressure coupling, of a coupler head formed with a slot receiving a tongue of a companion head and provided with a tongue adapted to enter the slot of the companion head during coupling movement, said coupler head also having a coupling face adapted to be moved into coupling position with a coöperating coupling face of a companion head, there being a port in the coupling face of the head adapted to register with a port in the coupling face of the companion head, a gasket seated in the port adapted to engage a gasket seated in the port of the companion head at the end of the coupling movement, means for guiding the tongue away from the coupling face of a companion head during the coupling movement, and means for effecting engagement of the coupling face with the coupling face of a companion head at the end of the coupling movement, the coupling heads remaining at the point of maximum lateral displacement from their normal positions until the coupling faces engage each other.

6. The combination, in a fluid pressure coupling, of a coupler head formed with a slot receiving a tongue of a companion head and provided with a tongue adapted to enter the slot of the companion head during coupling movement, said coupler head also having an inclined coupling face adapted to be moved into coupling position with a coöperating coupling face of a companion head, there being a port in the coupling face of the head adapted to register with a port in the coupling face of the companion head, a gasket seated in the port adapted to engage a gasket seated in the port of the companion head at the end of the coupling movement, means for guiding the tongue away from the coupling face of a companion head during the coupling movement, and means for effecting engagement of the coupling face with the coupling face of a companion head at the end of the coupling movement and at the point of maximum lateral displacement of the coupling heads.

7. The combination, in a fluid pressure coupling, of a coupler head formed with a slot receiving a tongue of a companion head and provided with a tongue adapted to enter the slot of the companion head during coupling movement, said coupler head also having an inclined coupling face adapted to be moved into coupling position with a coöperating coupling face of a companion head, there being a port in the coupling face adapted to register with a port in the coupling face of the companion head, a gasket seated in the port for engagement with a gasket seated in the port of the companion head at the end of the coupling movement, means for shifting the tongue laterally away from the coupling face of the companion head during preliminary coupling movement, and means for subsequently causing the heads to move substantially parallel with their longitudinal axes to bring the inclined coupling face into coupled engagement with the inclined coupling face of a companion head at the end of the coupling movement.

8. The combination, in a fluid pressure coupling, of a coupler head formed with a slot receiving a tongue of a companion head and provided with a tongue adapted to enter the slot of the companion head during coupling movement, said coupler head also having an inclined coupling face adapted to be moved into coupling position with a coöperating coupling face of a companion head, there being a port in the coupling face adapted to register with a port in the coupling face of the companion head, a gasket seated in the port for engagement with a gasket seated in the port of the companion head at the end of the coupling movement, guiding means for shifting the heads laterally away from each other during preliminary coupling movement to prevent the tongue from engaging the coupling face of a companion head and a second guiding means for maintaining such disengagement of the tongue during further coupling movement and for causing the heads to move substantially parallel with their longitudinal axes to bring the inclined coupling face into coupling engagement with the inclined coupling face of a companion head at the end of the coupling movement.

9. The combination, in a fluid pressure coupling, of a coupler head formed with a slot receiving a tongue of a companion head and provided with a tongue adapted to enter the slot of the companion head during coupling movement, said coupler head also having an inclined coupling face adapted to be moved into coupling position with a coöperating coupling face of a companion head, there being a port in the coupling face adapted to register with a port in the coupling face of the companion head, a gasket seated in the port for engagement with a gasket seated in the port of the companion head at the end of the coupling movement, an outer guiding member formed on the head engageable with a similar member on the companion head for shifting the heads laterally away from each other during preliminary coupling movement to prevent the tongue from engaging the coupling face of a companion head and an inner guiding means on the head engageable with the tongue on the companion head for causing the heads to move substantially parallel with their longitudinal axes to bring the inclined coupling face into coupling engagement with the inclined coupling face of a companion head at the end of the coupling movement.

10. The combination, in a fluid pressure coupling, of a coupler head adapted to be moved longitudinally into coupled position with a companion head, there being a port in the head adapted to register with a port in the companion head, a gasket seated in the port for engagement with a gasket of the companion port, and means for shifting the head laterally during coupling movement to prevent the head from engaging the gasket of a companion head and means for maintaining the heads at the point of maximum lateral displacement.

11. The combination, in a fluid pressure coupling, of a coupler head having a coupling face inclined to the longitudinal axis of the head and adapted to be moved into coupled position with a coöperating similarly formed coupling face of a companion head, there being a port in the coupling face of the head adapted to register with a port in the coupling face of the companion head, a gasket seated in the port adapted to engage a gasket seated in the port of the companion head at the end of the coupling movement, means for shifting the coupler head laterally away from the companion head during coupling movements, and means for moving the heads substantially parallel to their longitudinal axes to effect engagement of the gasket in one head with the gasket in the companion head.

12. The combination, in a fluid pressure coupling, of a coupler head having a coupler face inclined with respect to the longitudinal axis of the head and adapted to be moved into coupling position with a similarly formed coupling face of a companion head, there being a port in the coupling face adapted to register with a port in the face of the companion head, a gasket seated in the port for engagement with a gasket in the companion port, means for shifting the head laterally away from the companion head during the initial portion of the coupling movement to prevent the head from engaging the gasket of the companion head, and means for subsequently moving the heads parallel to their longitudinal axes until the gaskets are brought into engagement with each other.

13. The combination, in a fluid pressure coupling of a coupler head having a coupler face adapted to be moved into coupling position with a coupling face of a companion head, there being a port in the coupling face adapted to register with a port in the face of the companion head, a gasket seated in the port for engagement with a gasket in the companion port, means for shifting the head laterally away from the companion head during the initial portion of the coupling movement to prevent the head from engaging the gasket of the companion head, and means for preventing the coupler heads moving laterally toward one another during the remainder of the coupling movement.

LEONIDAS D. WOODRUFF.

Copies of this patent may be obtained for five cents each, by addressing the "Commissioner of Patents, Washington, D. C."